(No Model.)

F. STUEMPFLE.
SCREW ELEVATING MECHANISM.

No. 582,963. Patented May 18, 1897.

Witnesses
H. H. Mills.
A. S. Diven.

Inventor
Frederick Stuempfle
by Eugene Diven
Attorney

UNITED STATES PATENT OFFICE.

FREDERICK STUEMPFLE, OF ELMIRA, NEW YORK.

SCREW ELEVATING MECHANISM.

SPECIFICATION forming part of Letters Patent No. 582,963, dated May 18, 1897.

Application filed September 12, 1896. Serial No. 605,578. (No model.)

*To all whom it may concern:*

Be it known that I, FREDERICK STUEMPFLE, a citizen of the United States, residing at Elmira, in the county of Chemung and State of New York, have invented certain new and useful Improvements in Screw Elevating Mechanisms, of which the following is a specification.

My invention relates to improvements in screw elevating mechanisms such as are applied to extension-ladder trucks for raising the main ladder, to water-towers for raising the mast or telescopic tube, or to other apparatus in which a screw is employed to elevate some portion of the machinery; and the object of my improvements is to attach the traveling nut and trunnion-block of the screw to the other portions of the apparatus in such a manner that they may be allowed some small lateral play, whereby the bearings of the screw shall always be in true axial alinement and the screw be made to turn freely without binding. I have illustrated my invention as applied to what is known as the "Hayes" truck, the screw elevating mechanism for which is described in Letters Patent No. 202,169, granted April 9, 1878, to Daniel D. Hayes. In this class of apparatus as now constructed the traveling nut and trunnion-block are only arranged to turn vertically about their supporting axes. Great care is required in fitting the braces and supporting-blocks when the apparatus is being assembled in order to bring the nut and block into line, and however perfectly this may be done there is always a liability that the apparatus may become strained from a blow or heavy usage in service in such manner as to throw these parts out of line and cause the screw to bind and work very hard. This is a serious fault in fire apparatus, where it is very essential that all parts shall work freely and rapidly.

A further object of my invention is to provide for the quick removal of the screw, nut, and trunnion-block without disturbing the alinement of the braces and supporting-pieces.

I attain these objects by the mechanism illustrated in the accompanying drawings, in which—

Figure 1:
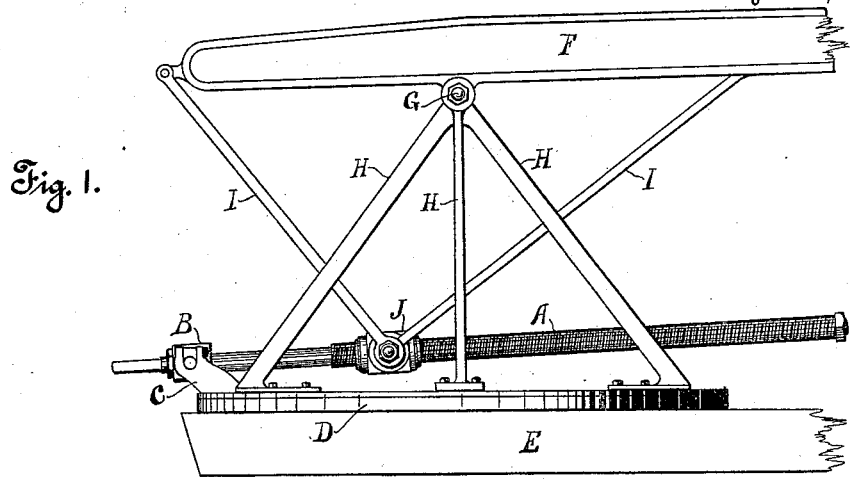
Figure 2:
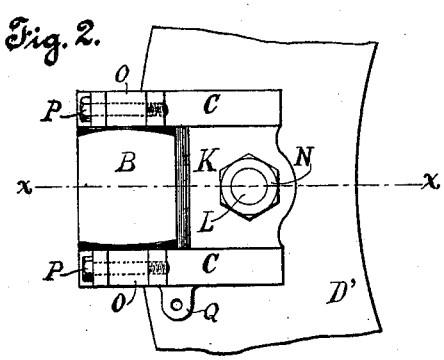
Figure 4:
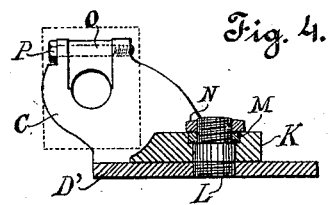
Figure 3:
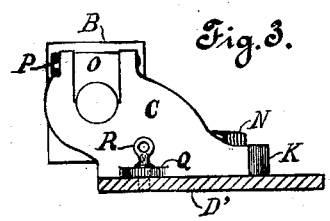

Figure 1 is a side elevation of a portion of a turn-table extension-ladder truck, showing the elevating mechanism; Fig. 2, a plan view of the trunnion-block and support, showing my improvement; Fig. 3, a side elevation of the same; Fig. 4, a section on the line $xx$ in Fig. 2; and Figs. 5 and 6, details showing the manner in which I attach the traveling nut.

Similar letters refer to similar parts throughout the several views.

Referring to Fig. 1, A is the elevating-screw, which is supported at one end in the trunnion-block B, held by cheek-pieces C to the movable member of the turn-table D, which in turn is attached to the body E of the truck.

F is the butt-ladder, pivoted on the shaft G, which is supported above the turn-table by the braces H H H, attached to the movable member. Braces I I depend from the sides of the ladder at front and rear of its pivotal point, and the traveling nut J is pivotally connected to the lower end of these braces, so as to turn freely therein in a vertical plane. As this truck is now constructed the cheek-pieces C are solid castings bored to receive the trunnions and rigidly attached to the movable member of the turn-table. The traveling nut is a solid block bored out to receive a brass bushing carrying the threads for the screw and having the pivotal studs at its sides an integral part thereof. The trunnion-block and traveling nut can therefore only swing in a vertical plane, and if the braces I I are not carefully set, so as to bring the nut J into axial alinement with the trunnion-block B, or if they become sprung out of line in service, the screw must bear the strain, and it will not work easily. To obviate the difficulty, I swivel the nut and the trunnion-block, so that they may swing into line when from any cause the braces I I are thrown out of their central position. In Figs. 2, 3, and 4 the cheek-pieces C are shown cast integral with a base K, which is held upon the top or movable plate D' of the turn-table by means of the large pivotal bolt L. This bolt is screwed or otherwise rigidly fastened to the plate D', and the base K is counterbored, so as to receive a washer M of the same depth as the counterbore, which is screwed or otherwise fastened down upon a shoulder on the bolt L and held from turning or rising by the jam-nut N. The cheek-pieces are thus held securely to the turn-table and yet are free to swing about the pivotal bolt L. In order to insert the trunnion-block in the cheek-pieces, I slot the latter down to the trunnion-bearing and provide the blocks O O, securing them in place by the bolts P P.

Q is a lug on the side of one of the cheek-pieces provided with a hole through which a pin R may be dropped into a corresponding hole in the plate D', whereby the cheek-pieces may be held from turning away from their central position.

Figure 5:
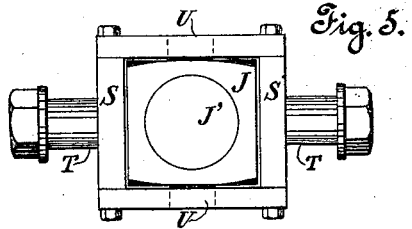
Figure 6:
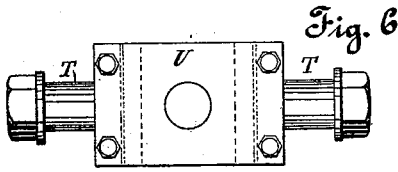

In Figs. 5 and 6 is shown the block J of the traveling nut, which is bored out at J' to receive the threaded bushing. Surrounding this block is a frame composed of the two side pieces S S, provided with the pivotal studs T T to receive the eyes of the braces I I, and the top and bottom pieces U U, bolted thereto, as indicated. The pieces U U are bored to receive the pivot-pins on the top and bottom of the block J. The spaces between the sides of the block J and the side pieces S S are made sufficiently wide to allow for any desirable turning of the block J. It will be seen that by removing the blocks O O and the top plate U the screw A, with the trunnion-block and nut, may be very quickly taken out and replaced, if repairs become necessary, without disturbing the braces I I or cheek-pieces C C, and extreme care will not be required in setting the parts back in proper alinement, as they will naturally fall into line of themselves. Instead of swiveling the cheek-pieces as described I may attach them rigidly to the turn-table, as is now done, and provide the trunnion-block with a swivel-frame such as shown in Figs. 5 and 6.

I do not wish to be considered as limiting the application of my invention solely to apparatus of the type specified, since it is evident that it is applicable as well to all other apparatus wherein a screw is made use of for elevating parts of the machine in the manner described.

What I do claim as my invention, and desire to secure by Letters Patent, is—

1. In a screw elevating mechanism, the combination with the screw of a nut and trunnion-block each pivoted to swing in two directions, substantially as described and for the purpose set forth.

2. In a screw elevating mechanism, a trunnion-block for the screw pivoted to swing in two different planes, substantially as described and for the purpose set forth.

3. In a screw elevating mechanism, a trunnion-block for the screw, cheek-pieces adapted to receive the trunnions of the trunnion-block, a base-plate attached to the cheek-pieces, a foundation-plate, and a pivotal bolt or stud, in combination substantially as described and for the purpose set forth.

4. In a screw elevating mechanism, the combination, with the trunnion-block, of cheek-pieces adapted to receive the trunnions thereof, there being slots in the cheek-pieces opening into the trunnion-bearings, and blocks fitting the slots and bolted therein to hold the trunnion-block in place and provide an upper bearing therefor.

5. In a screw elevating mechanism, the combination with the trunnion-block of cheek-pieces to receive the trunnions thereof, a foundation-plate, a base-plate attached to the cheek-pieces and swiveled on the foundation-plate, a boss projecting from one of the cheek-pieces provided with a hole, and a pin adapted to drop through this hole into a corresponding hole in the foundation-plate to lock the cheek-pieces in a central position.

6. In a screw elevating mechanism, a traveling nut upon the screw, an inclosing frame in which the nut is pivoted, and studs projecting from the frame at right angles to the pivot-pins on the nut by which the frame is pivoted to the portion of the apparatus to be elevated, in combination substantially as described and for the purpose set forth.

In testimony whereof I have affixed my signature in presence of two witnesses.

FREDERICK STUEMPFLE.

Witnesses:
HOLLIS H. MILLS,
A. S. DIVEN.